No. 802,433. PATENTED OCT. 24, 1905.
A. J. STORY.
FARM GATE.
APPLICATION FILED MAR. 29, 1904.
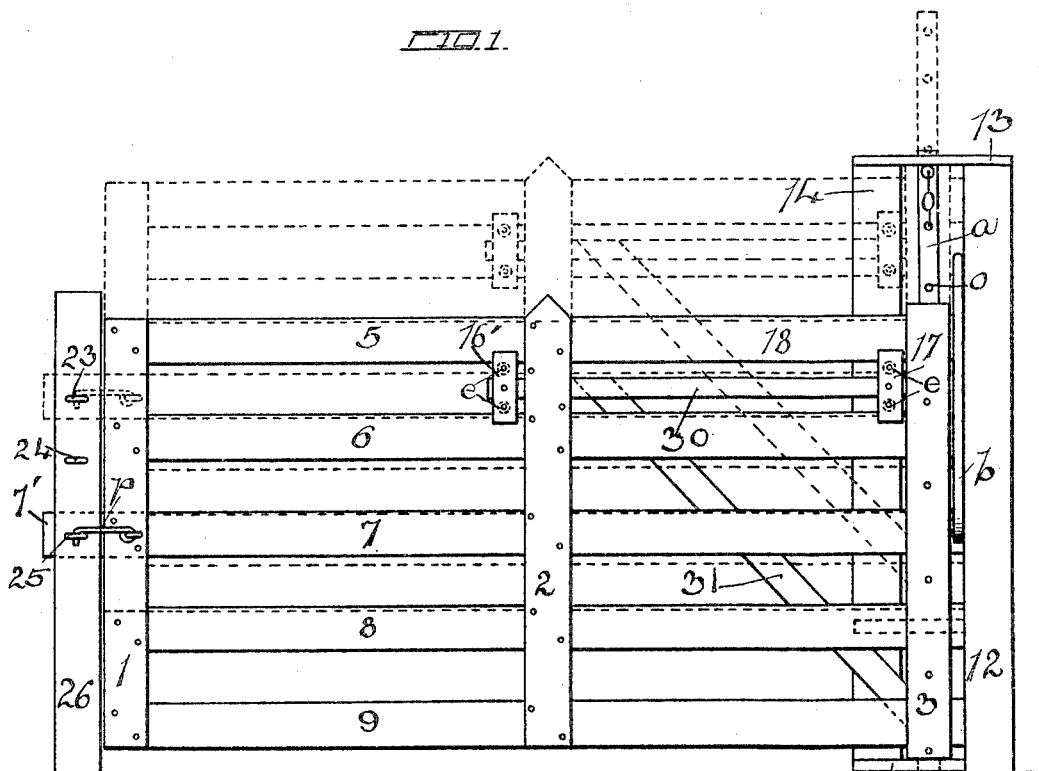
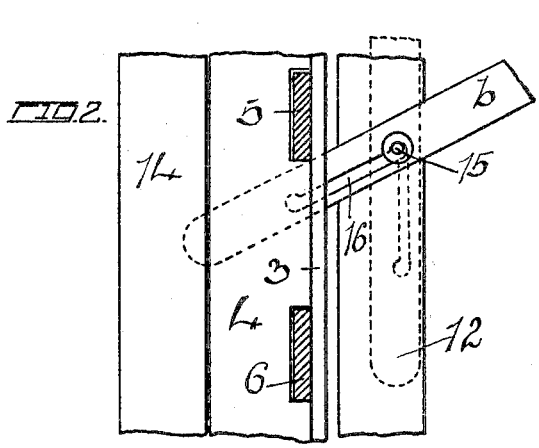
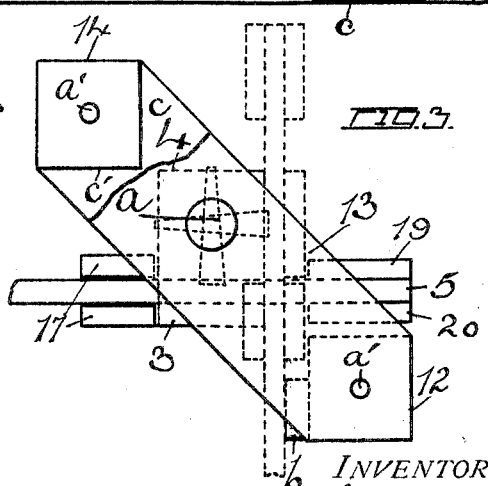
WITNESSES:
F. G. Larson
Meta Sands
INVENTOR:
Alva J. Story
Geo. W. Sues
BY
Attorney.

UNITED STATES PATENT OFFICE.

ALVA J. STORY, OF AUDUBON, IOWA.

FARM-GATE.

No. 802,433.        Specification of Letters Patent.        Patented Oct. 24, 1905.

Application filed March 29, 1904. Serial No. 200,593.

*To all whom it may concern:*

Be it known that I, ALVA J. STORY, residing at Audubon, in the county of Audubon and State of Iowa, have invented certain useful Improvements in Farm-Gates; and I do hereby declare that the following is a full, clear, and exact description of the invention, such as will enable others skilled in the art to which it appertains to make and use the same, reference being had to the accompanying drawings, which form a part of this specification.

This invention relates to a new and useful improvement in means for raising farm-gates.

The aim of my invention is to provide a gate so adapted that the same may be given vertical adjustment, so that the gate may be raised a certain distance from the ground to permit the passage of certain animals below the same, while at the same time performing the functions of a gate to prevent larger animals from escaping, and my invention embodies certain other improvements in a mechanism for raising a gate, as will be described more fully hereinafter and finally pointed out in the claim.

In the accompanying drawings I have shown in Figure 1 a side elevation of the gate embodying my invention. Fig. 2 shows a broken detached end view of the raising-lever, while Fig. 3 discloses a broken top view showing the position of the two supporting-posts.

In carrying out the aim of my invention, I construct a gate comprising the central vertical member 2, to which are secured the horizontal members 5, 6, 7, 8, and 9. In front these members are secured between two similar end bars 1 1, and upon the opposite end these horizontal members are secured between the end bars 19 and 20, as shown in top view in Fig. 3.

The central horizontal bar 7 is made to project a suitable distance beyond the end bars 1, as is shown in Fig. 1, and to one of the members 1 is secured an ordinary hook $p$, adapted to work into one of the eyelets 25, 24, or 23, as disclosed in Fig. 1, depending upon the vertical position of the gate, the gate-post 26 being slotted to receive the projecting end 7', as is shown in Fig. 1.

This gate is slidably supported by a revolubly-supported and vertically-adjustable main supporting-post 4, which main supporting-post is recessed, as is shown in Fig. 2, so that the horizontal gate members 5, 6, 7, 8, and 9 may be readily slid or carried backward and forward within the recesses. In carrying the gate backward or forward the horizontal members are held within the recesses by means of the bar 3, as shown in Fig. 1. The revolubly-supported and vertically-adjustable main supporting-post 4 is below, pivotally secured to a bar $c$, which is notched upon opposite ends to provide the angular seatings $c'$, as shown in Fig. 3, so that this base-plate $c$ may be raised and lowered between the guiding-posts 12 and 14. Projecting from this main supporting-post 4 is a shaft $a$, provided with a plurality of pin-openings $o$, which projects through the top plate 13, as shown in Fig. 1. Projecting from this main supporting-post 4 is a horizontally-disposed bar 30, provided with the cleats 16' and 17, supporting suitable rollers $e$, (shown in dotted lines in Fig. 1,) so that the gate proper is held upon the upper set of rollers $e$, permitting the gate to be carried backward and forward in a horizontal plane at any time, the entire load, with the gate, being carried by the rollers $e$.

Now should the gate be positioned, as disclosed in Fig. 1, to form a hog-tight gate a foot-passenger in passing through the gate would unhook the hook $b$ and slide the gate backward, actuating the gate horizontally, and after passing through again close the gate. Should the gate be used in a pasture where it is desired to permit hogs and sheep to pass under the same, the operator would raise the gate to one of its two elevated positions by placing the lower end of the lever $b$, as shown in Fig. 2, under one of the gate members—as 5, for instance—and tilting the lever $b$ to raise the gate, the lever being slotted and working upon a pin 15, so that this lever can be readily adjusted below the horizontal members of the gate. As the main supporting-post 4 rises a pin should be inserted within one of the openings $a$ above the top plate 13, so that the pin will support the post 4 and the post in turn the gate. The post 4, however, being revolubly supported, the same can be turned fully ninety degrees to permit the gate being fully swung at right angles to allow the passage of vehicles. Where the gate is first carried backward its full length, so that the central vertical member 2 will come adjacent the cleat 17, the gate is practically balanced, and so can be readily turned in opening the same ninety degrees to permit the passage of vehicles.

It should be noted that the posts 14 and 12 act as stops in limiting the movement of the gate when the same is swung.

From this it will be seen that I provide a gate which can be carried backward and forward in opening the same, which can be raised and lowered, and which finally may be opened and closed, working upon a pivot.

It is of course understood that the gate may be made in several sizes, and in winter may be raised to avoid snowdrifts, and is so constructed that but little power is necessary to actuate the same a sufficient distance to permit the ready passage of foot-passengers.

Having thus described my said invention, what I claim as new, and desire to secure by United States Letters Patent, is—

In a gate of the character described, provided with horizontal bars, the combination of a post adapted to receive one end of said horizontal bars, said post being revolubly supported and vertically adjustable, a bar secured to said post, said bar being notched upon opposite ends, two fence-posts, said notched bar being vertically adjustable between said posts, a shaft projecting from said revolubly-supported post, said shaft being provided with a plurality of pin-openings, a top plate secured to said fence-posts, said shaft passing through said last-mentioned top plate, a pin secured to one of said guiding-posts, and a lever provided with a slot engaged by said pin, said lever being adapted to be brought below one of said horizontal bars, substantially in the manner set forth.

In testimony whereof I affix my signature in presence of two witnesses.

ALVA J. STORY.

Witnesses:
B. S. PHELPS,
GEORGE COSSON.